March 2, 1948.  R. E. PETERSON ET AL  2,437,039
STAPLE DRIVING IMPLEMENT
Filed March 16, 1945  4 Sheets-Sheet 1

INVENTORS,
Roy E. Peterson,
Howard M. Larsen,
BY
ATTORNEY

March 2, 1948.  R. E. PETERSON ET AL  2,437,039
STAPLE DRIVING IMPLEMENT
Filed March 16, 1945  4 Sheets-Sheet 3

INVENTORS,
Roy E. Peterson,
Howard M. Larsen,
BY
ATTORNEY

Patented Mar. 2, 1948

2,437,039

UNITED STATES PATENT OFFICE 2,437,039

STAPLE DRIVING IMPLEMENT

Roy E. Peterson, Norwalk, and Howard M. Larsen, Fairfield, Conn., assignors, by mesne assignments, to Hotchkiss Realty Corporation, Norwalk, Conn., a corporation of Delaware Application March 16, 1945, Serial No. 583,108

20 Claims. (Cl. 1—49)

This invention relates to portable staple driving implements particularly of the work tacking type wherein a power spring is tensioned by hand actuation for driving staples point foremost into work from an automatically fed supply of staples stored in the implement.

An important object of the invention is to avoid the damaging effects of shock sustained by the frame and working parts of such an implement as a result of abruptly checking the sharp blow of the staple delivering parts. It is also an object to reduce or eliminate tendency of the implement to rebound from the work being tacked responsively to such blow. The shock of the blow on the implement itself is particularly severe if hammering parts of weighty nature are operated idly as for firing staples through space, instead of directly into shock absorbing work against which the implement is pressed. Damage to the implement from these frequently repeated extra severe shocks may vary from actual fracturing of the implement frame to excessive wear or mechanical fatigue of the spring powered staple driving mechanism.

A related aim is to avoid the damaging effects of such shocks by generating kinetic inertia in the parts which strike the staple driving blow composed as largely as possible of accelerated speed and as little as possible of weighty hammering mass.

A contributory object is to produce a long operating stroke of a very light-weight staple driving ram in order to enable a power spring highly to accelerate the same when tensioned and released by small angular swinging movement of a hand operated actuating lever.

Another object is to dampen the blow of the staple driving parts in the absence of a staple to be driven, or in the absence of resistive work into which to drive a staple, by intercepting slantingly directed movement of such parts by means of an improved buffer construction that more effectively absorbs the impact of the staple driving power delivering parts before the same is transmitted to the frame of the implement.

A further object is to simplify and render more sturdy the actuating parts of a staple driving power delivering mechanism by reducing the number of such parts, the number of fulcrums on which they are pivoted and the number of actuating springs employed, and by arranging the parts to overlap one another guidingly in relatively swingable relationship.

A still further object is to make the staple driving power delivering parts easily accessible for inspection and readily removable from the implement for repair or replacement without necessitating the use of special tools.

These and other objects of the invention will become apparent in greater detail from the following description of a successful embodiment of the present improvements which description has reference to the appended drawings wherein:

Our improved staple tacker may advantageously be constructed in the actual size represented in Figs. 1–9, inclusive, of the drawings. The implement frame comprises a hollow staple driving head 10 at the front end of the tacker, an elongated hollow base portion 11 extending the entire length of the instrument at the bottom of the tacker, and a bridge-like portion or elongated hand grip 12, all of these frame portions being rigid with one another and, if desired, formed by an integral metal casting. If made of assembled forms of sheet metal, the frame body or its two halves on respectively opposite sides of the longitudinal central line 6—6 in Fig. 2, may comprise separable housing parts which may be secured together by any suitable means, such as by screw fastenings, rivets, eyelets or spot welding.

The depressible handle or operating lever 13 is swingably mounted on the frame carried pivot pin 14 by means of its bifurcate extension 15 which projects downward into an upward opening channel 16 that extends horizontally lengthwise of the grip 12 and which for improved appearance and better protection of the working parts may be flanked by heightened stationary side walls 17 removably secured to the frame casting by screws 18 or if preferred cast integral therewith. Thus handle 13 is pivotally mounted at a location on the implement frame to swing toward and away from channel 16 in a manner to traverse an angular gap between the channel and the position of the handle most remote therefrom shown in Figs. 1 and 6.

Figure 11:
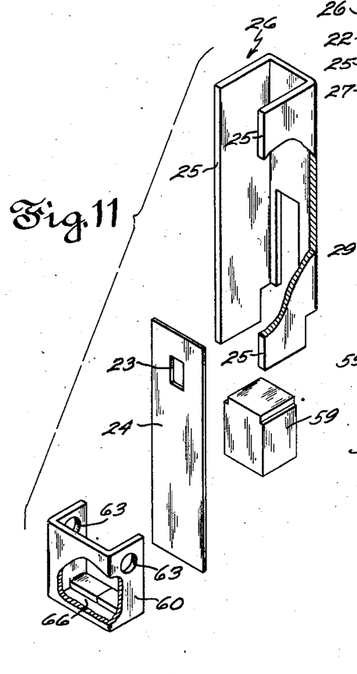
Fig. 11 is an exploded view of various parts removed from the stapling head of Fig. 10.

The implement head 10 is recessed to form a vertically elongated spring chamber 22 in which reciprocates vertically a staple driving ram blade 24 best shown in Fig. 11 containing a rectangular aperture 23. Vertical slide bearing for guiding the blade 24 in a straight path of reciprocative movement is afforded by the front edges 25 of the stiff channel piece 26 which lines spring chamber 22, and the blade 24 is constrained in sliding contact with such channel piece edges 25 by the front wall of a slide cover 32. In this slide cover there is bumped out forwardly a narrow vertically elongated channel 31 which provides clearance for a blade impelling lug 29 on power transmitting lever 28. Lug 29 projects forward through aperture 23 in the staple driver or ram blade 24 with sufficient clearance to permit lug 29 to move in an arcuate path while blade 24 moves in a straight path and without any binding between these parts. Power lever 28 is included in the staple driving mechanism and is swingably mounted on the same pivot pin 14 as is handle 13 and is located centrally within bifurcate extension 15 of the latter. A power spring 27 is constantly compressed between the top end of chamber 22 and the top edge of power lever 28. The latter has an upstanding anchorage lug 33 which projects guidingly into the bottom end of spring coil 27. The latter is otherwise unattached to lever 28 but merely bears on same and is thereby easily separable from lever 28 for ready removal from chamber 22.

Figures 1, 5:
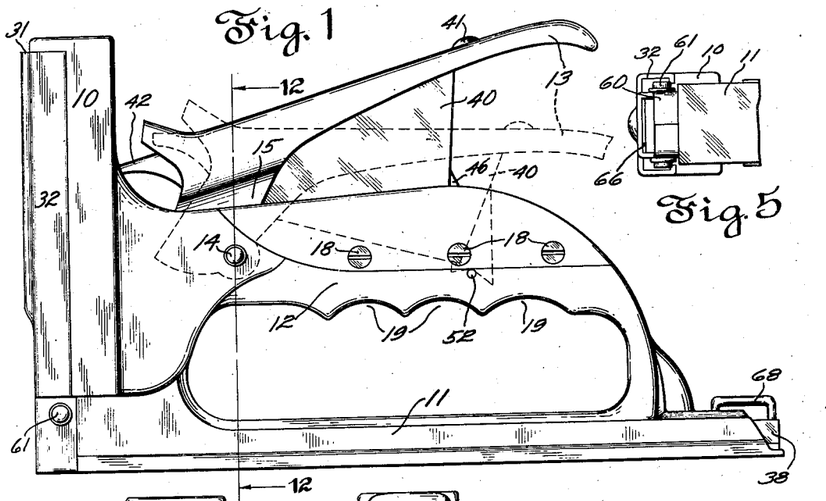
Fig. 1 is a view in side elevation showing a staple tacking instrument incorporating the present improvements.
Fig. 5 is a fragmentary bottom plan view of the staple discharging corner of the implement.
Figure 2:
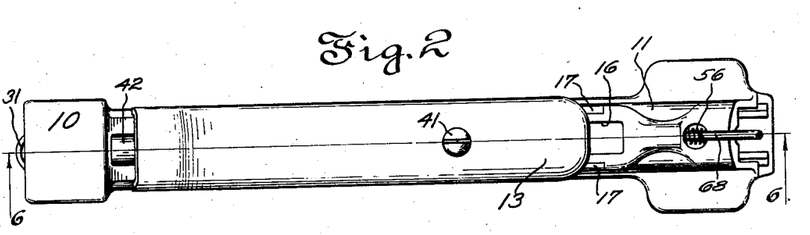
Figs. 2, 3 and 4 are, respectively, a plan view, a front view and a rear end view of the same.
Figure 3:
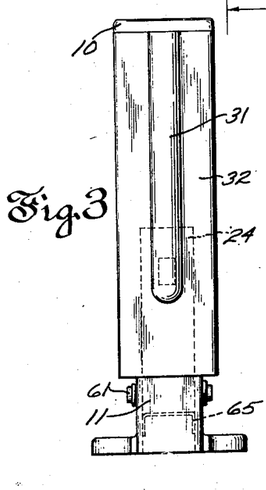
Figure 4:
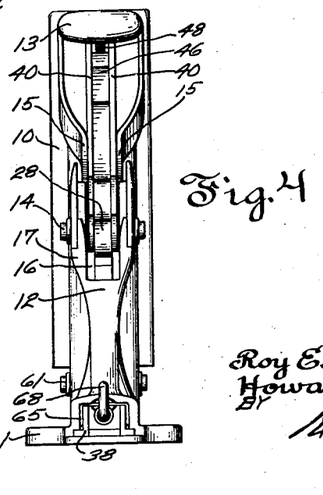
Figure 6:
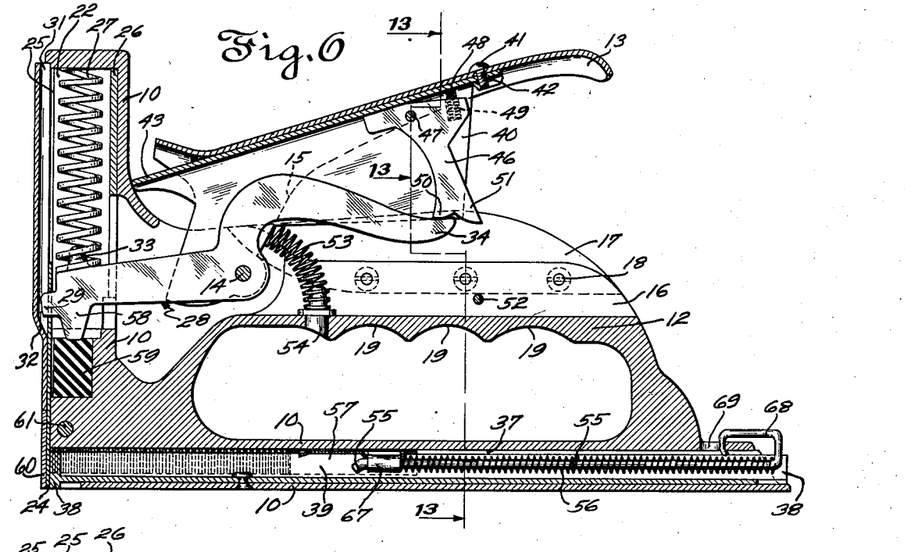
Fig. 6 is a view taken in section on the plane 6—6 in Fig. 2 looking in the direction of the arrows with the operating handle normally positioned as in Fig. 1.
Figures 9, 10:
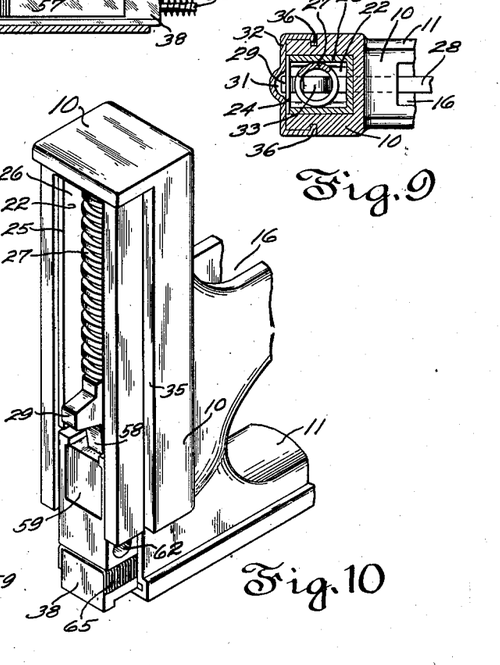
Fig. 9 is a fragmentary plan view taken in section on the plane 9—9 in Fig. 8.
Fig. 10 is a fragmentary isometric view of the staple driving head of the instrument with its front slide cover removed to expose the interior working mechanism.

The manner in which the inturned flanges 36 of the side walls of slide cover 32 slidably engage and occupy the lateral grooves 35 in frame head 10 as a means of holding the cover removably in place as shown in Figs. 1, 3 and 6 is apparent from Fig. 9 and is referred to in greater particular in United States Patent No. 2,143,384 granted to R. E. Peterson and need not here be described in greater detail.

Referring particularly to Figs. 6, 8, 12 and 14, handle lever 13 is seen to be equipped with a rigid skirt 40 in the nature of an inverted U-shaped channel member whose two spaced side walls or flanges are interposed between power lever 28 and the bifurcate extension 15 of handle lever 13 and extend to and are pivotally mounted on the pivot pin 14 thereby to increase the aggregate thickness of metal comprising the hub bearing of handle lever 13 in contact with this pivot pin. The roof wall of skirt 40 joins together the skirt flanges and is fixedly fastened to dished handle lever 13 by a screw 41. The skirt further is braced against lateral tipping relative to the handle lever by side lugs 42 which conformingly abut against the under surface of the handle lever. The front end of skirt 40 projects to form a stop horn 43 which abuts the rear shoulder of the implement head 10 and serves to limit the upward swinging movement of the handle to its position shown in Figs. 1 and 6.

Figures 12, 13:
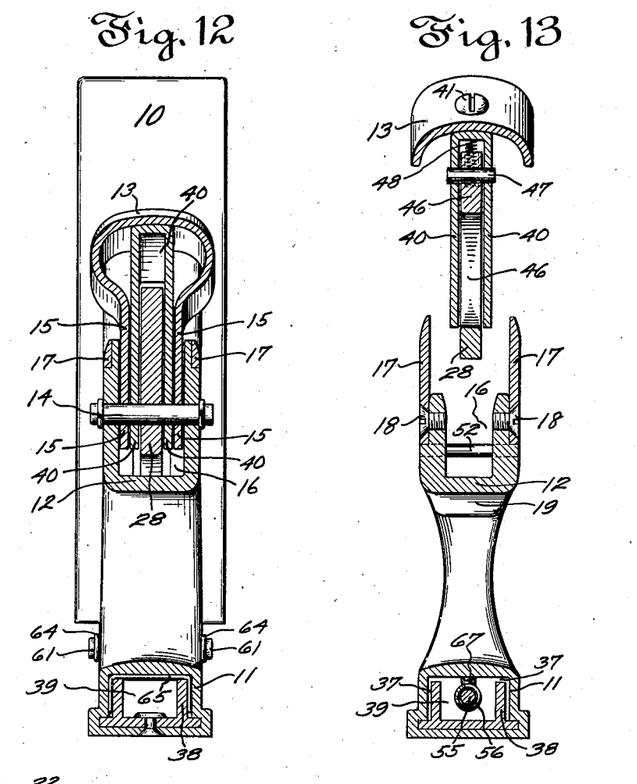
Fig. 12 is a view drawn on an enlarged scale taken in section on the plane 12—12 in Fig. 1 looking in the direction of the arrows.
Fig. 13 is a view drawn on a similar enlarged scale taken in section on the plane 13—13 in Fig. 6 looking in the direction of the arrows.
Figure 14:
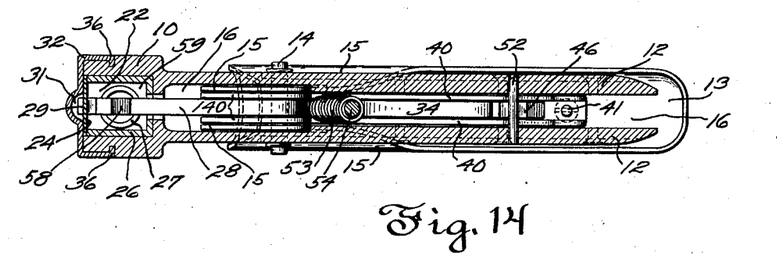
Fig. 14 is a view taken in section on the plane 14—14 in Fig. 7 looking in the direction of the arrows.

Between the spaced rigid side walls of skirt 40 power lever 28 has a rearward extension 34 which is free to swing relatively to the handle and skirt, this extension being slidably guided and concealed by said skirt walls. Also swingable between and relatively to the side walls or flanges of skirt 40 is a driving connection including pawl 46 pivotally mounted on a cross pin 47 whose opposite ends are fixedly lodged in the said side walls of skirt 40 as shown in Fig. 13. Skirt 40 flanks pawl 46 in a position to enter channel 16 and is of shape and size substantially to fill the angular expanse of the gap between handle 13 and channel 16 in all positions of the former thereby shielding pawl 46 at all times. Pawl 46 is rockable on pin 47 between its position shown in Fig. 6 and its disabling position shown in Fig. 8, the angularly inclined upper edges of the pawl abutting with the roof wall of skirt 40 to determine these limit positions. Thus pawl 46 comprises instrumentalities for operating the staple driving mechanism and travels with and extends from handle 31 in a direction to span the angular gap between the latter and channel 16. A small spring coil 48 seated in a blind hole 49 in the top edge of the pawl is constantly under axial compression and thrusts against the roof wall of skirt 40 to bias pawl 46 clockwise or constantly toward its position shown in Figs. 6 and 7. The lower end of pawl 46 is divided into an impelling spur 50 and a tripping spur 51 which latter traverses a path to encounter and be deflected by a cross pin 52 at a particular point in its downward travel. This cross pin bridges channel 16 and is lodged in the side walls of grip 12 as shown in Figs. 13 and 14. Thus pawl 46 is operative normally to transmit impelling force from the handle lever 13 to power lever 28 in only one direction of lever swinging movement and cross pin 52 of the trip means causes pawl 46 to shift relatively to handle lever 13 to disabling position at a predetermined point in the clockwise swinging movement of handle lever 13.

Figure 7:
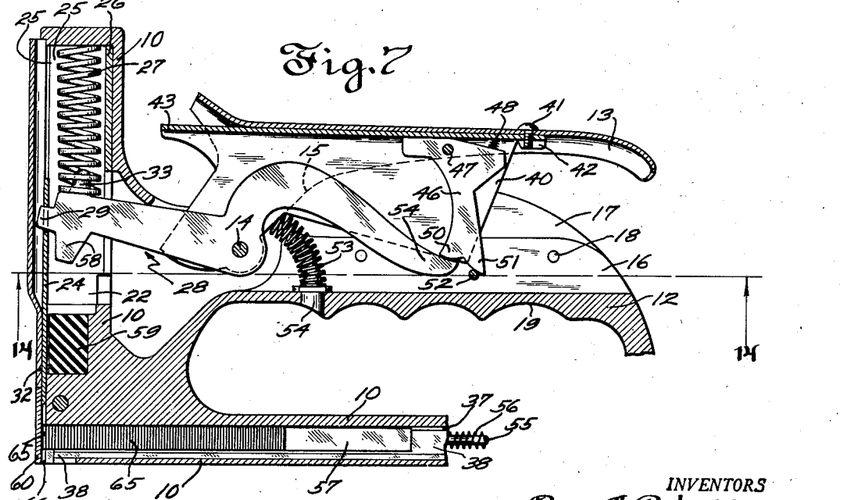
Fig. 7 is a fragmentary view like Fig. 6 showing the actuating handle depressed to an extent that just precedes escapement of the power lever.
Figure 8:
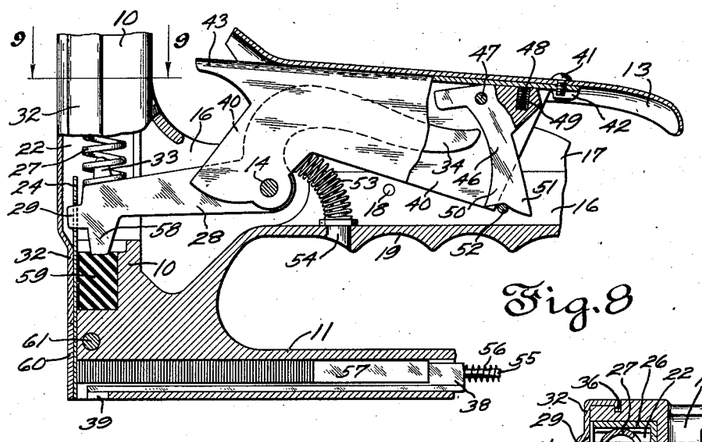
Fig. 8 is a view similar to Fig. 7 showing the power delivering lever at the end of its staple driving stroke.

For restoring handle 13 and its carried skirt 40 to their uppermost positions shown in Figs. 1 and 6, an auxiliary spring herein shown as an arcuately deflected spring coil 53 is anchored in the floor wall of channel 16 in the grip 12 by means of the removable spring stud 54. The free upper or moving end of spring coil 53 passes constantly against the laterally spaced bottom edges of skirt 40 in a direction to urge handle 13 counterclockwise about its pivot pin 14. Figs. 6, 7 and 8 make clear that at no time does spring 53 encounter or interfere with the free full swinging movement of power lever 28 owing to the bowed shape of the latter.

Power lever 28 has a downward directed buffer nose 58 which meets a buffer block 59 whose shape is best shown in Fig. 11 and which should be composed of solid rubber or equivalent resilient shock absorbing material capable of receiving and dampening the blow thereagainst of buffer nose 58 without becoming permanently dented or deformed thereby. Block 59 is removably installed with a press fit in the implement head 10 by sliding it backward into a cavity tightly fitting the block. Such cavity may be afforded by the shape to which the implement frame is cast. The aforementioned slide cover 32 when once in place flanks the front of the bumper block 59 but leaves sufficient space between itself and this block to afford a vertical raceway for ram blade 24.

Slide cover 32 is held in place by a corner cap 60 removably fastened in place at the staple delivering nose of the implement by any suitable holding means such as the coupling pin 61 passing through a hole 62 in the frame head and through registering holes 63 in cap 60. Pin 61 may releasably be retained by split guard rings 64 of spring wire or by threaded screw members or in any other suitable way.

The elongated horizontal base 11 of the implement contains and completely encompasses a magazine chamber or passageway 39 extending lengthwise thereof and opening through both the front end and the rear end of the base. The cross sectional shape of this chamber will be clear from Figs. 4, 12 and 13. The entire length of chamber 39 is occupied by the staple guiding track bar 38 whose cross sectional shape is likewise shown in said Figs. 4, 12 and 13. This leaves a space between track bar 38 and chamber 39 forming an inverted U-shaped passageway 37 through which staples 65 are fed toward the front end of the implement where they are admitted one by one into the staple ejecting orifice 66 at the bottom end of the raceway under ram blade 24. This feeding of the staples is automatically performed in conventional manner by the staple follower 57 which rides along passageway 37 and is constantly biased toward the left in Fig. 6 by a long staple-feeding spring 56 loosely surrounding a rod 55 along which a guide loop 67 that fixedly depends from the staple follower 57 is freely slidable. Spring 56 bears at its forward end against said guide loop 67 and at its rear end bears against the upright reach of the bent handle end 68 of rod 55. The free terminus of this handle hooks retainingly but removably into an anchorage hole 69 in the roof wall of magazine chamber 39.

The operation of the aforedescribed parts consists in grasping the grip 12 together with the handle lever 13 within the palm of the operator's hand, the grip notches 19 affording natural locating seats for the operator's fingers. The size of the parts is such that the heel of the operator's thumb can easily reach and rest atop the handle lever 13 ready to depress it by a clenching action of the hand. The implement as a whole can thus be firmly grasped and steadily maneuvered for placing its staple ejecting orifice 66 at any precise and easily observed location where it is desired to drive a staple.

Steady squeezing action of the operator's hand now depresses handle lever 13 from its position in Figs. 1 and 6 to its position in Fig. 7 against the combined resistance of power spring 27 and handle restoring spring 53. During this spring tensioning stroke of handle 13 power lever 28 is propelled clockwise from its position in Fig. 6 to its position in Fig. 7 owing to the engagement of its rearward extension 34 by the spur 50 on pawl 46. The reactive force between these parts is not in a direction to set up any force moment tending to turn pawl 46 counterclockwise about pivot 47. The direction of such reactive force in relation to pawl pivot 47 remains constant throughout the stroke because of the fact that firing lever 28 and handle 13 swing about the same pivotal axis. When the clockwise swinging of power lever 28 has sufficiently lifted ram blade 24 to clear the staple ejecting raceway, the staple feeding spring 56 urges staple follower 57 and the entire strip of staples 55 forward so that the front staple automatically comes to occupy the raceway under blade 24 as shown in Fig. 7.

In Fig. 7 it will be seen that the tripping spur 51 of pawl 46 at this point encounters the intercepting cross pin 52 this spur and pin thus cooperating as trip means whereby continued downward movement of handle 13 causes the pawl to be cammed or deflected counterclockwise about its pivot pin 47 to such an extent that power lever 28 escapes the driving spur 50 of the pawl. Now power spring 27 abruptly forces the light weight power lever counterclockwise building up great speed therein which speed is imparted to ram blade 24 so that the latter drives the foremost staple 65 swiftly out of orifice 66 into the work that is to be tacked. If the driving of the staple into the work does not arrest this power stroke, the firing lever 28 is arrested resiliently with a minimum degree of rebound by the shock absorbing interception of buffer block 59 when struck by the buffer nose 58 of the power lever. This however will take place only after ram blade 24 has moved downward a little farther than is required to drive the staple fully into the work. After the staple firing stroke of lever 28 takes place, handle 13 is released by spreading open the hand so that spring 53 acts to lift the handle to its initial position shown in Figs. 1 and 6 ready for subsequent actuation. In its lifting travel with handle 13 pawl 46 wipes against the end 34 of power lever 28 as is permitted by the yielding of pawl spring 48 until driving spur 50 arrives just above the firing lever at which time the pawl springs toward the left into its position shown in Fig. 6 ready again to impell the power lever downward.

While the power spring coil 27 is shown as made of square or flat sided wire, round wire may be substituted and there are many other possible substitutes and alternatives for the particular shapes and arrangements of parts herein shown, wherefore all such susbtitutes and alternatives are comprehended and included within the intended meaning of the following claims.

We claim:

1. In a portable staple driving implement, pawl operated staple driving mechanism including the combination with an implement frame of, a handle lever pivotally mounted on said frame to swing about an axis, a power lever pivotally mounted to swing about said pivotal axis, a staple driver impellably related to said power lever, and driving connection shiftably carried on one of said levers and arranged to transmit impelling force from said handle lever to said power lever in only one direction of lever swinging movement, a power spring stationed by said frame arranged to urge said power lever in the opposite direction of swinging movement, and an auxiliary spring stationed by said frame arranged to urge said handle lever in said opposite rotary direction.

2. In a portable staple driving implement, pawl operated staple driving mechanism including the combination with an implement frame of, a swingable handle lever, a power lever, a staple driver guided by said frame in a straight path of movement and impellably engaged by the front end portion of said power lever, and driving connection shiftably carried on one of said levers and arranged to transmit impelling force from said handle lever to said power lever in only one direction of lever swinging movement, a power spring urging said power lever in the opposite direction of swinging movement stationed by said frame and arranged to engage with said front end portion of said firing lever and to follow movement of the latter along said path of movement of said staple driver, and an auxiliary spring stationed by said frame arranged to urge said handle lever in said opposite rotary direction.

3. In a portable staple driving implement, pawl operated staple driving mechanism including the combination with an implement frame of, a swingable handle lever, a power lever, a staple driving blade substantially as thin as the thickness of the driven staple slidably guided in a straight path of endwise sliding movement by said frame and impellably engaged directly by said power lever, and driving connection shiftably carried on one of said levers and arranged to transmit impelling force from said handle lever to said power lever in only one direction of lever swinging movement, a power spring stationed by said frame arranged to urge said firing lever in the opposite direction of swinging movement, and an auxiliary spring stationed by said frame arranged to urge said handle lever in said opposite rotary direction.

4. In a portable staple driving implement, pawl operated staple driving mechanism including the combination with an implement frame of, a swingable handle lever, a staple driver comprising a blade slidably guided by said frame for endwise reciprocative movement in a straight path, a power lever pivotally mounted on said frame in such position that one end of said power lever impellingly engages said blade while moving arcuately along said straight path of blade movement, and driving connection shiftably carried on one of said levers and arranged to transmit impelling force from said handle lever to said power lever in only one direction of lever swinging movement, a power spring stationed by said frame arranged to urge said power lever in the opposite direction of swinging movement, and an auxiliary spring stationed by said frame arranged to urge said handle lever in said opposite rotary direction, together with a shock absorbing abutment on said implement frame positioned to intercept the arcuate movement of said firing lever end while the latter is traveling arcuately in slanting relation to said straight path of blade movement.

5. In a portable staple driving implement, pawl operated staple driving mechanism including the combination with an implement frame of, a swingable handle lever, a swingable power lever, a staple driver impellably related to said power lever, a drive transmitting connection carried on one of said levers in a manner to be shiftable relatively thereto and operative normally to transmit impelling force from said handle lever to said power lever in only one direction of swinging movement, a power spring stationed by said frame arranged to urge said power lever in the opposite direction of swinging movement, a connection tripping device constructed and arranged to cause automatic shifting of said drive transmitting connection relatively to said one of said levers to a disabling position at a predetermined point in the swinging movement of said one of said levers in the said one direction, and an auxiliary spring stationed by said frame arranged to urge said handle lever in said opposite rotary direction.

6. In a portable staple driving implement, pawl operated staple driving mechanism including the combination with an implement frame of, a handle lever mounted on said frame to swing about a pivotal axis, a power lever mounted on said frame to swing about said pivotal axis, a staple driver impellably related to said power lever, a shiftable driving connection carried on one of said levers and operative normally to transmit impelling force from said handle lever to said power lever in only one direction of swinging movement, a power spring stationed by said frame arranged to urge said power lever in the opposite direction of swinging movement, trip means automatically operative to shift said driving connection to a disabling position at a predetermined point in the swinging movement of said one of said levers, and an auxiliary spring stationed by said frame arranged to urge said handle lever in said opposite rotary direction.

7. In a portable staple driving implement, pawl operated staple driving mechanism including the combination with an implement frame of, a swingable handle lever, a swingable power lever, a staple driver impellably related to said power lever, a shiftable driving connection carried on one of said levers and operative normally to transmit impelling force from said handle lever to said power lever in only one direction of swinging movement, a power spring stationed by said frame arranged to urge said power lever in the opposite direction of swinging movement, trip means arranged to shift said driving connection to a disabling position at a predetermined point in the swinging movement of said one of said levers, and an auxiliary spring stationed by said frame arranged to urge said handle lever in said opposite rotary direction, the said driving connection including a pawl pivotally mounted on said handle lever yieldably biased to a position normally to engage impellingly with said power lever and to encounter said trip means while traveling with said handle lever.

8. In a portable staple driving implement, pawl operated staple driving mechanism including the combination with an implement frame of, a swingable handle lever, a staple driver impellably related to said power lever, a shiftable driving connection carried on one of said levers and operative normally to transmit impelling force from said handle lever to said power lever in only one direction of swinging movement, a power spring stationed by said frame arranged to urge said power lever in the opposite direction of swinging movement, trip means for shifting said driving connection to a disabling position at a predetermined point in the swinging movement of said one of said levers including an interceptor stationed on said implement frame in a position to be engaged by and to deflect said driving connection while the latter is riding with one of said levers and in a manner freeing said power lever from impelling engagement by said driving connection, and an auxiliary spring stationed by said frame arranged to urge said handle lever in said opposite rotary direction.

9. In a portable staple driving implement, pawl operated staple driving mechanism including the combination with an implement frame of, a swingable handle lever, a swingable power lever, a staple driver impellably related to said power lever, a shiftable driving connection carried on one of said levers and operative normally to transmit impelling force from said handle lever to said power lever in only one direction of swinging movement, a power spring stationed by said frame arranged to urge said power lever in the opposite direction of swinging movement, trip means for shifting said driving connection to a disabling position at a predetermined point in the swinging movement of said one of said levers including a pawl pivotally mounted on said handle lever yieldably biased to a position normally to engage impellingly with said power lever and an interceptor stationed on the implement frame in a position to be engaged by and cause deflection of said driving connection while riding with said handle lever and in a manner to free said power lever from impelling engagement by said pawl, and an auxiliary spring stationed by said frame arranged to urge said handle lever in said opposite rotary direction.

10. In a portable staple driving implement, pawl operated staple driving mechanism including the combination with an implement frame of, a swingable handle lever, a swingable power lever having a front end portion, a staple driver impellably engaged by said front end portion of the power lever, a shiftable driving connection carried on one of said levers and operative normally to transmit impelling force from said handle lever to said power lever in only one direction of swinging movement, a power spring stationed by said frame arranged to thrust against said front end portion of the power lever in the opposite direction of lever swinging movement and in the direction of staple driving movement of said driver, trip means automatically operative to shift said driving connection to a disabling position at a predetermined point in the swinging movement of said one of said levers, and an auxiliary spring stationed by said frame arranged to urge said handle lever in said opposite rotary direction.

11. In a portable staple driving implement, pawl operated staple driving mechanism including the combination with an implement frame of, a swingable handle lever, a swingable power lever having opposite ends, a pivot intermediate said lever ends on which said power lever swings, a staple driver impellably engaged by one of said power lever ends; a shiftable driving connection impellingly engaging the other of said opposite ends of the power lever carried on said handle lever and operative normally to transmit impelling force from said handle lever to said power lever in only one direction of swinging movement, a power spring stationed by said frame arranged to urge said power lever in the opposite direction of swinging movement, trip means automatically operative to shift said driving connection to a disabling position at a predetermined point in the swinging movement of said one of said levers, and an auxiliary spring stationed by said frame arranged to urge said handle lever in said opposite rotary direction.

12. In a portable staple driving implement, pawl operated staple driving mechanism including the combination with an implement frame of, a swingable handle lever, a staple driver impellably related to said power lever comprising a blade slidably guided by said implement frame for endwise reciprocative movement in a straight path, a swingable power lever pivotally mounted on said frame in such position that one end of said power lever impellingly engages said blade while moving arcuately in directions slantingly related to said straight path of blade movement, a shiftable driving connection carried on one of said levers and operative normally to transmit impelling force from said handle lever to said power lever in only one direction of swinging movement, a power spring stationed by said frame arranged to urge said power lever in the opposite direction of swinging movement, trip means automatically operative to shift said driving connection to a disabling position at a predetermined point in the swinging movement of said one of said levers, and an auxiliary spring stationed by said frame arranged to urge said handle lever in said opposite rotary direction, together with a shock absorbing abutment on said implement frame positioned to intercept the arcuate movement of said power lever while the latter is traveling in slanting relation to said path of blade movement.

13. In a portable staple driving implement, pawl operated staple driving mechanism including the combination with an implement frame of, a swingable handle lever, a staple driver impellably related to said power lever comprising a blade slidably guided by said implement frame for endwise reciprocative movement in a straight path, a swingable power lever pivotally mounted on said frame in such position that one end of said power lever impellingly engages said blade while moving arcuately in directions slantingly related to said straight path of blade movement, a shiftable driving connection carried on one of said levers and operative normally to transmit impelling force from said handle lever to said power lever in only one direction of swinging movement, a power spring stationed by said frame arranged to urge said power lever in the opposite direction of swinging movement, trip means automatically operative to shift said driving connection to a disabling position at a predetermined point in the swinging movement of said one of said levers, and an auxiliary spring stationed by said frame arranged to urge said handle lever in said opposite rotary direction, together with a shock absorbing block of rubber embedded in said implement frame positioned to intercept the arcuate movement of said power lever while the latter is traveling in slanting relation to said path of blade movement.

14. In a staple driving implement the combination of, a frame including a grip adapted to be grasped by the operator's hand having spaced side walls defining a channel space therebetween, a handle pivotally mounted on said frame and diverging from said grip to leave an angular gap therebetween, staple driving mechanism in part located in said angular gap including a power lever, a skirt carried by said handle occupying said angular gap and swingable into and out of said channel space by movements of said handle, and pivotal support means on said frame on which said power lever said skirt and said handle are mounted for swinging movement about a common axis.

15. In a staple driving implement the combination of, a frame including a grip adapted to be grasped by the operator's hand having spaced side walls defining a channel space therebetween, a handle pivotally mounted on said frame to swing about an axis and diverging from said grip to leave an angular gap therebetween, staple driving mechanism in part located in said angular gap including a power lever pivotally mounted on said frame to swing about said axis, a skirt carried by said handle occupying said angular gap and swingable into and out of said channel space by movements of said handle, and a pawl operatively engageable with said power lever pivotally mounted on said skirt.

16. In a staple driving implement the combination of, a frame including a grip adapted to be grasped by the operator's hand having spaced side walls defining a channel space therebetween, a handle pivotally mounted on said frame and diverging from said grip to leave an angular gap therebetween, staple driving mechanism in part located in said angular gap including a power lever, a skirt carried by said handle occupying said angular gap and swingable into and out of said channel space by movements of said handle, and a pivot pin on said frame on which said power lever said skirt and said handle all have pivotal bearing side by side.

17. In a staple driving implement the combination of, a frame including a grip adapted to be grasped by the operator's hand having spaced side walls defining a channel space therebetween, a pivot pin bridging said channel space, a handle swingably mounted on said pivot pin and diverging from said grip to leave an angular gap therebetween, staple driving mechanism in part located in said angular gap including a power lever swingably mounted on said pivot pin, a skirt fixed to said handle swingably mounted on said pivot pin occupying said angular gap and swingable into and out of said channel space by movements of said handle, said power lever, handle and skirt being side by side.

18. In a stapling implement incorporating staple driving mechanism, the combination of, an implement frame including an elongated hand grip portion, spaced stationary side walls rigid with and extending away from said grip portion defining a channel along the latter, an elongated handle pivotally mounted at a location on said frame to swing toward and away from said channel in a manner to traverse an angular gap between said channel and the position of said handle most remote therefrom, instrumentalities for operating the staple driving mechanism traveling with and extending from said handle in a direction to span said angular gap, and a rigid skirt on said handle flanking said instrumentalities in a position to enter said channel, said skirt being of shape and size substantially to fill the angular expanse of said gap in all positions of said handle in a manner to flank and shield said instrumentalities at all times.

19. In a stapling implement incorporating staple driving mechanism, the combination of, an implement frame including an elongated hand grip portion, spaced stationary side walls rigid with and extending away from said grip portion defining a channel along the latter, an elongated handle pivotally mounted at a location on said frame to swing toward and away from said channel in a manner to traverse an angular gap between said channel and the position of said handle most remote therefrom, instrumentalities for operating the staple driving mechanism traveling with and extending from said handle in a direction to span said angular gap, and two rigid spaced skirt forming flanges joined at their tops and thereat fixedly mounted on said handle respectively flanking opposite sides of said instrumentalities and positioned to enter said channel, each of said flanges being of shape and size substantially to fill the angular expanse of said gap in all positions of said handle in a manner to cover and shield said instrumentalities at all times.

20. In a stapling implement incorporating staple driving mechanism, the combination of, an implement frame including an elongated hand grip portion, spaced stationary side walls rigid with and extending away from said grip portion defining a channel along the latter, an elongated handle pivotally mounted at a location on said frame to swing toward and away from said channel in a manner to traverse an angular gap between said channel and the position of said handle most remote therefrom, two rigid spaced skirt forming flanges joined at their tops and thereat fixedly mounted on said handle of shape and size substantially to fill the angular expanse of said gap in all positions of said handle, and a pawl for operating the staple driving mechanism pivotally mounted on and between said skirt forming flanges to swing relatively thereto and parallel therewith, said pawl being shaped and arranged to span the said angular gap.

ROY E. PETERSON.
HOWARD M. LARSEN.

REFERENCES CITED

The following references are of record in the file of this patent:

UNITED STATES PATENTS

| Number | Name | Date |
| --- | --- | --- |
| 1,990,725 | Crofoot | Feb. 12, 1935 |
| 2,086,922 | Peterson | July 13, 1937 |
| 2,232,016 | Walker | Feb. 18, 1941 |
| 2,314,847 | Polzer | Mar. 23, 1943 |
| 2,326,540 | Krantz | Aug. 10, 1943 |

Certificate of Correction

Patent No. 2,437,039.  March 2, 1948.

ROY E. PETERSON ET AL.

It is hereby certified that errors appear in the printed specification of the above numbered patent requiring correction as follows: Column 1, line 11, after the word "staple" insert *driving power*; column 8, line 49, claim 8, after the word and comma "lever," insert *a swingable power lever,*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*